(12) United States Patent
Calebrese et al.

(10) Patent No.: US 10,848,027 B2
(45) Date of Patent: Nov. 24, 2020

(54) ELECTRICAL INSULATION SYSTEMS AND INSULATED COMPONENTS FOR ELECTRICAL MACHINE

(71) Applicant: General Electric Company, Schenectady, NY (US)

(72) Inventors: Christopher Michael Calebrese, Albany, NY (US); Wei Zhang, Ballston Lake, NY (US); Robert Colin McTigue, Coeymans Hollow, NY (US); Stephen Francis Francese, Malta, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 787 days.

(21) Appl. No.: 15/353,861

(22) Filed: Nov. 17, 2016

(65) Prior Publication Data

US 2018/0138772 A1   May 17, 2018

(51) Int. Cl.
*H02K 3/30* (2006.01)
*H01B 3/08* (2006.01)
(Continued)

(52) U.S. Cl.
CPC ............... *H02K 3/30* (2013.01); *C08J 5/24* (2013.01); *C09J 7/30* (2018.01); *H01B 3/04* (2013.01);
(Continued)

(58) Field of Classification Search
CPC .. H02K 3/30; H02K 3/32; H02K 3/34; H02K 3/345; H02K 3/40; H01B 3/04;
(Continued)

(56) References Cited

U.S. PATENT DOCUMENTS 3,618,753 A * 11/1971 Glasspoole ............ H01B 3/04
428/324
4,224,541 A * 9/1980 Smith ..................... G01B 3/40
310/45

(Continued)

FOREIGN PATENT DOCUMENTS

| CN | 202332327 U | 7/2012 |
|----|-------------|--------|
| DE | 10360895 A1 | 7/2004 |

OTHER PUBLICATIONS

Kim et al., "Assessment of deterioration in epoxy/mica machine insulation", IEEE Transactions on Electrical Insulation, vol. 27, Issue: 5, pp. 1026-1039, Oct. 1992.

(Continued)

*Primary Examiner* — Jue Zhang
*Assistant Examiner* — David A. Singh
(74) *Attorney, Agent, or Firm* — Christopher R. Carroll; The Small Patent Law Group LLC

(57) ABSTRACT

An electrical insulating system and an associated insulated stator bar are provided. The electrical insulating system includes an electrically insulating mica paper and a fiber glass disposed on a first surface of the electrically insulating mica paper. The electrically insulating mica paper and the fiber glass are impregnated with a curable binder resin composition. The curable binder resin composition includes about 21 weight percent to about 73 weight percent of a solid or semi-solid epoxy resin having an epoxide functionality of about 2.5, about 0.8 weight percent to about 49 weight percent of a liquid epoxy resin having an epoxide functionality of about 2, about 4 weight percent to about 15 weight percent of a bisphenol A-formaldehyde novolac, a metal acetylacetonate catalyst, and about 2.5 weight percent to about 15 weight percent of a toughener selected from the (Continued)

group consisting of polyethersulfone, methylmethacrylate butadiene styrene, and a combination thereof.

20 Claims, 9 Drawing Sheets

(51) Int. Cl.
*H01B 3/04* (2006.01)
*C09J 7/30* (2018.01)
*C08J 5/24* (2006.01)
*H02K 3/34* (2006.01)
*C09J 163/00* (2006.01)

(52) U.S. Cl.
CPC .............. *H01B 3/082* (2013.01); *H01B 3/084* (2013.01); *H02K 3/345* (2013.01); *C08J 2363/00* (2013.01); *C08J 2455/02* (2013.01); *C08J 2481/06* (2013.01); *C09J 163/00* (2013.01); *C09J 2203/00* (2013.01); *C09J 2463/00* (2013.01)

(58) Field of Classification Search
CPC ... H01B 3/08; H01B 3/082; H01B 3/40; C08J 5/043; C08J 5/24; C08J 2363/00; C08J 2455/02; C08J 2481/06; C09J 163/00; C09J 2463/00

USPC .................... 310/10, 40 R, 43, 45, 196, 215; 174/25 R, 110 E, 113 C, 120 R, 121 SR, 174/120 SR, 110 SR, 137 R, 255–260; 428/209

See application file for complete search history.

(56) References Cited

U.S. PATENT DOCUMENTS

| | | | |
|---|---|---|---|
| 4,286,010 A * | 8/1981 | Staley | B32B 19/06 428/215 |
| 4,606,785 A | 8/1986 | Zeise | |
| 4,704,322 A | 11/1987 | Roberts | |
| 5,618,891 A | 4/1997 | Markovitz | |
| 6,190,775 B1 | 2/2001 | Smith et al. | |
| 6,359,232 B1 * | 3/2002 | Markovitz | H01B 3/04 174/137 B |
| 7,547,847 B2 | 6/2009 | Miller | |
| 8,669,473 B2 | 3/2014 | Ikeda et al. | |
| 9,202,607 B2 * | 12/2015 | Cawse | C08G 59/5033 |
| 2011/0224332 A1 * | 9/2011 | He | C08G 59/42 523/456 |
| 2014/0138008 A1 | 5/2014 | Gröppel et al. | |
| 2014/0246929 A1 * | 9/2014 | Francese | H02K 3/30 310/52 |
| 2014/0326481 A1 | 11/2014 | Gröppel et al. | |

OTHER PUBLICATIONS

Leijon et al., "A recent development in the electrical insulation systems of generators and transformers", IEEE Electrical Insulation Magazine, vol. 17, Issue: 3, pp. 10-15, May-Jun. 2001.

* cited by examiner

ELECTRICAL INSULATION SYSTEMS AND INSULATED COMPONENTS FOR ELECTRICAL MACHINE

FIELD

The disclosure generally relates to an electrical insulating system. More particularly, the disclosure relates to an electrically insulating mica tape-based insulating system and insulated components of an electrical machine.

BACKGROUND

Mica-based electrical insulation systems are currently employed for high voltage and medium voltage machines. A mica-based electrical insulation system generally includes a combination of a binder resin (e.g., a thermosetting resin) and a carrier tape (e.g., a mica tape) that provides sufficient mechanical strength and discharge resistance for the electrical insulation system. The binder resin, which is often partially cross-linked, melts and cures upon heating to provide the final shape to the carrier tape.

Thermosetting resins that allow convenient impregnation of reinforcing fibers are generally used as a suitable binder resin. Thermosetting binder resins such as epoxy resins possess desirable mechanical properties, thermal stability, and chemical resistance. However, when used at higher temperatures, the performance of some of these thermosetting resins may be unsatisfactory and results in significant thermal degradation. Reinforcing fibers such as fiberglass are often impregnated in the thermosetting binder resins to improve thermal properties. However, many of the conventional impregnating materials generate cracks at the operating temperatures of the electrical machines. So, it is desirable to improve the mechanical properties of an electrical insulating system that are used for high or medium voltage electrical machines such as a generator.

Epoxy resins are cross-linked polymers having desirable properties such as high strength, high stiffness, and good solvent resistance, which make them suitable for use in applications such as adhesives, sealants, coatings, and for electrical applications. However, increased stiffness of an epoxy resin makes the resin inherently brittle, which results in crack propagation. Modification of epoxy resins using additives, modifiers, fillers, plasticizers and other polymers offers opportunities to customize the attributes of these materials. Efforts have been made to improve the mechanical properties (e.g., fracture toughness) of epoxy resins by different approaches, for example, by adding second-phase polymers such as rubbers and thermoplastics. Adding rubber to the epoxy resin increases resin toughness but decreases resin stiffness. Adding a rigid thermoplastic increases the toughness of an epoxy resin but reduces the resin's solvent resistance. Random addition of commonly known tougheners to brittle epoxy resins may form interfaces that meet the toughening requirements. However, random addition of such tougheners often causes deterioration of other desirable properties including solvent resistance and stiffness.

Therefore, there exists a need for a mica tape-based electrical insulating system, which can be used at high temperatures and high voltages, and which provides desired mechanical strength without affecting other desirable properties such as solvent resistance or stiffness.

BRIEF DESCRIPTION OF THE INVENTION

One or more embodiments of an electrical insulating system are provided. The electrical insulating system comprises an electrically insulating mica paper and a fiber glass disposed on a first surface of the electrically insulating mica paper. The electrically insulating mica paper and the fiber glass are impregnated with a curable binder resin composition. The curable binder resin composition includes about 21 weight percent to about 73 weight percent of a solid or semi-solid epoxy resin, about 0.8 weight percent to about 49 weight percent of a liquid epoxy resin, about 4 weight percent to about 15 weight percent of a bisphenol A-formaldehyde novolac, a metal acetylacetonate catalyst, and about 2.5 weight percent to about 15 weight percent of a toughener. The toughner is selected from polyethersulfone, methylmethacrylate butadiene styrene, or a combination of polyethersulfone and methylmethacrylate butadiene styrene. The solid or semi-solid epoxy resin has an epoxide functionality of about 2.5 and the liquid epoxy resin has an epoxide functionality of about 2.

One or more embodiments of a stator bar are provided. The stator bar comprises a plurality of conductors arranged in a group and a groundwall insulation surrounding the group of the plurality of conductors. The groundwall insulation comprises one or more layers of an electrically insulating mica tape. The electrically insulating mica tape comprises an electrically insulating mica paper and a fiber glass disposed on a first surface of the electrically insulating mica paper. The electrically insulating mica paper is bound to the fiber glass via a cured form of a curable binder resin composition. The curable binder resin composition comprises about 21 weight percent to about 73 weight percent of a solid or semi-solid epoxy resin, about 0.8 weight percent to about 49 weight percent of a liquid epoxy resin, about 4 weight percent to about 15 weight percent of a bisphenol A-formaldehyde novolac, a metal acetylacetonate catalyst, and about 2.5 weight percent to about 15 weight percent of a toughener. The toughner is either polyethersulfone or methylmethacrylate butadiene styrene, or a combination of polyethersulfone and methylmethacrylate butadiene styrene. The solid or semi-solid epoxy resin has an epoxide functionality of about 2.5 and the liquid epoxy resin has an epoxide functionality of about 2.

In some other embodiments, a stator bar is provided. The stator bar comprises a plurality of conductors arranged in a group and a groundwall insulation surrounding the group of the plurality of conductors. The groundwall insulation comprises one or more layers of an electrically insulating mica tape. The electrically insulating mica tape comprises an electrically insulating mica paper and a fiber glass, which is disposed on a first surface of the electrically insulating mica paper. The electrically insulating mica paper is bound to the fiber glass via a cured form of a curable binder resin composition. The curable binder resin composition comprises about 53 weight percent to about 61 weight percent of a solid or semi-solid epoxy resin, about 23 weight percent to about 26 weight percent of a liquid epoxy resin, about 4 weight percent to about 15 weight percent of a bisphenol A-formaldehyde novolac, a metal acetylacetonate catalyst, and about 2.5 weight percent to about 15 weight percent of a toughener. The toughner is selected from polyethersulfone, methylmethacrylate butadiene styrene, or a combination of polyethersulfone and methylmethacrylate butadiene styrene. The solid or semi-solid epoxy resin has an epoxide functionality of about 2.5 and the liquid epoxy resin has an epoxide functionality of about 2.

DRAWINGS

These and other features, aspects, and advantages of the present invention will become better understood when the following detailed description is read with reference to the accompanying drawings, wherein.

DETAILED DESCRIPTION

Figure 1:
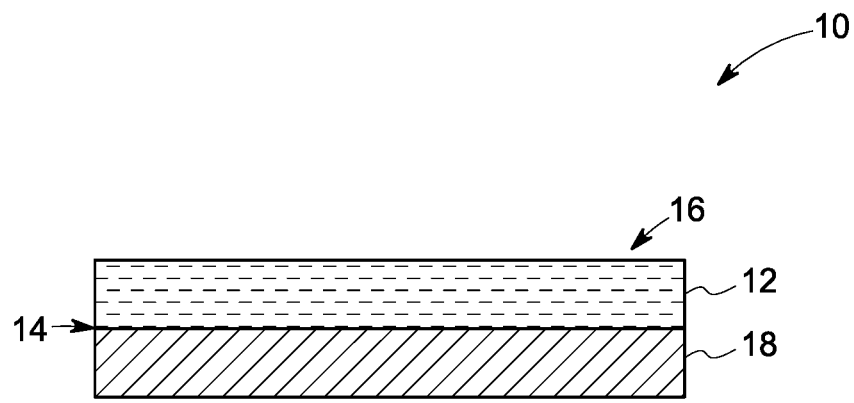
FIG. 1 is a schematic representation of a cross-sectional view of an electrically insulating mica tape in accordance with one embodiment of the disclosure.

The following detailed description is exemplary and not intended to limit the invention or uses of the invention. Throughout the specification, exemplification of specific terms should be considered as non-limiting examples. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Unless otherwise indicated, all numbers expressing quantities of ingredients, properties such as molecular weight, reaction conditions, so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. Where necessary, ranges have been supplied and those ranges are inclusive of all sub-ranges there between.

To more clearly and concisely describe and point out the subject matter of the claimed invention, the following definitions are provided for specific terms, which are used in the following description and the appended claims.

As used herein, the term "epoxy resin" refers to a low molecular weight pre-polymer or a higher molecular weight polymer that normally contains at least two epoxide groups.

As used herein, the term "solid epoxy resin" refers to a higher molecular weight epoxy polymer that is in a solid state at room temperature (20° C.). The mean molecular weight of a solid epoxy resin is generally greater than 1000 g/mol. The term "semi-solid epoxy resin" refers to an epoxy resin that is in a semi solid state at room temperature (20° C.). The semi-solid epoxy resins generally have a mean molecular weight between 500-700 g/mol.

As used herein, the term "liquid epoxy resin" refers to an epoxy resin that is in a liquid state at room temperature (20° C.) even in the absence of any solvent. The mean molecular weight of the liquid epoxy resin is generally greater than 300 g/mol and less than 500 g/mol.

As used herein, the term "epoxy functionality" refers to the average number of epoxy groups per (number of) epoxy resin molecule. For example, an epoxy resin having an epoxy functionality of 2.5 means the epoxy resin contains, on an average, 2.5 number of epoxy groups per epoxy resin molecule.

As used herein, the term "disposed on" refers to coating, depositing and/or forming a layer onto a surface using any known method in the art. The phrase "disposed on" includes the instance of forming a layer (e.g., glass fiber layer) onto a surface (e.g., a first surface of an electrically insulating mica paper) such that the layer is in contact with the surface either directly or via a binder resin.

As used herein, the term "flexural strain to failure" refers to a resistance of a material of a component (e.g., a beam) when bending or flexing of the component is performed. The flexural strain to failure is calculated as a ratio of flexural stress to flexural strain in case of a flexural deformation. For example, the strain associated with the bending or flexing moments of a beam may be designated as flexural strain to failure. The flexural strain to failure is generally measured in percentage.

As used herein, the term "heat dissipation factor" refers to a ratio of the power dissipated in a dielectric material as heat to the power applied. The heat dissipation factor is a measure of the dielectric losses in an electrical insulating material when used in an alternating electric field, and of the energy dissipated as heat. The heat dissipation factor is generally measured in percentage.

As used herein, the term "electrical breakdown strength" or "breakdown strength" (BDS) refers to a measure of the dielectric breakdown resistance of a dielectric material under an applied AC or DC voltage. The applied voltage prior to breakdown is divided by the thickness of the dielectric material to provide the breakdown strength value. BDS is generally measured in units of potential difference over units of length such as volts per millimeter (V/mm or VPM).

One or more embodiments of the present disclosure is directed to an electrical insulating system. The electrical insulating system comprises an electrically insulating mica paper and a fiber glass, wherein the fiber glass is disposed on a first surface of the electrically insulating mica paper. The electrically insulating mica paper and the fiber glass are impregnated with a curable binder resin composition.

In some embodiments, the curable binder resin composition includes a thermosetting resin composition and a toughener. The thermosetting resin includes at least one catalysable epoxy resin, a catalyst for catalyzing the epoxy resin, and an accelerator. In some embodiments, the at least one catalysable epoxy resin comprises a solid or semi-solid epoxy resin and a liquid epoxy resin. The thermosetting resin comprising the solid or semi solid epoxy resin, a liquid epoxy resin, an accelerator and a catalyst is referred herein as an epoxy resin blend. In one specific embodiment, the thermosetting resin includes a solid or semi-solid epoxy resin, a liquid epoxy resin, a bisphenol A-formaldehyde novolac accelerator, a metal acetylacetonate catalyst, and a toughener; and the toughener is selected from polyethersulfone, methylmethacrylate butadiene styrene, or a combination of polyethersulfone and methylmethacrylate butadiene styrene. In some embodiments, the accelerator is present in amount that is less than the stoichiometric level in terms of epoxy:novlac ratio. In some embodiments, the bisphenol A-formaldehyde novolac is catalyzed by an acidic catalyst and has a hydroxyl equivalent weight of 120.

In some example embodiments, the curable binder resin composition comprises about 85 weight percent to about 97.5 weight percent of a thermosetting resin composition and about 2.5 weight percent to about 15 weight percent of the toughener selected from the group consisting of polyethersulfone, methylmethacrylate butadiene styrene, and a combination thereof. In some embodiments, the thermosetting resin composition consists essentially of a solid or semi-solid epoxy resin having an epoxide functionality of about 2.5, in an amount from about 25 weight percent to about 75 weight percent of the thermosetting resin composition, a liquid epoxy resin, having an epoxide functionality of about 2, in an amount from about 10 weight percent to about 50 weight percent of the thermosetting resin composition, a metal acetylacetonate catalyst; and a bisphenol A-formaldehyde novolac accelerator in an amount from about 5 weight percent to about 15 weight percent of the thermosetting resin composition. In such embodiments, the thermosetting resin composition may additionally contain other constituents that do not materially affect the basic properties of the thermosetting resin. For example, the thermosetting resin may include an additional filler material that does not negatively impact the insulation properties of the thermosetting resin composition.

In one example embodiment, the thermosetting resin composition comprises about 25 weight percent to about 75 weight percent of a solid or semi-solid epoxy resin, about 0.8 weight percent to about 49 weight percent of a liquid epoxy resin, about 1 weight percent to about 50 weight percent of a bisphenol A-formaldehyde novolac, and a metal acetylacetonate catalyst. In this example embodiment, the solid or semi-solid epoxy resin has an epoxide functionality of about 2.5 and the liquid epoxy resin has an epoxide functionality of about 2.

In some example embodiments, the curable binder resin composition comprises about 21 weight percent to about 73 weight percent of a solid or semi-solid epoxy resin, about 0.8 weight percent to about 49 weight percent of a liquid epoxy resin, about 4 weight percent to about 15 weight percent of a bisphenol A-formaldehyde novolac accelerator, a metal acetylacetonate catalyst, and about 2.5 weight percent to about 15 weight percent of a toughener. In this embodiment, all the recited weight percents are with respect to the curable binding composition. The toughener may be polyethersulfone, methylmethacrylate butadiene styrene, or a combination of polyethersulfone and methylmethacrylate butadiene styrene. In this example embodiment, the solid or semi-solid epoxy resin has an epoxide functionality of about 2.5 and the liquid epoxy resin has an epoxide functionality of about 2.

The curable binder resin composition is essentially unreactive at room temperature (e.g. 20° C.) and at elevated temperatures sufficient to enable its permeation to the electrically insulating mica paper and/or the fiber glass during the manufacture of the electrical insulation system. It is also essentially unreactive at temperatures required to remove moisture and volatiles during the processing of articles wrapped or taped with the electrical insulation system. However, it cures at a higher temperature without adversely affecting the cure characteristics of the resin composition. For example, the curable binder resin composition may be substantially unreactive at a temperature of up to about 120° C., but may undergo an epoxy-epoxy reaction at a temperature of about 165° C. to form a solid material having mechanical, thermal and electrical properties that are suitable to enable the fiberglass-coated mica paper to serve as an electrical insulating material.

The electrically insulating system is generally formed by bonding of the electrically insulating mica paper with the fiber glass by using the fiber glass as a backing sheet. In some embodiments, the electrically insulating mica paper is a sheet of cellulose with small mica flakes laid on the sheet. The mica flakes may be selected from muscovite ($KAl_2AlSi_3O_{10}(OH_2)$), or phlogopite ($KMg_3AlSi_3O_{10}(OH)_2$), or mixtures of muscovite and phlogopite. The mica flakes may be intercalated with at least one of Cr, Sn or Zn metal ions during mica paper felting, mica paper laying, or the bonding of the mica paper to the backing sheet. Mica has a high resistance to partial discharges and thereby it increases the voltage endurance and life of insulation materials.

The fiber glass may be used as a backing sheet for the electrically insulating mica paper to provide a support. In some embodiments, the fiber glass is used as a substrate for reinforcement and backing for mica to form an electrical insulating system. The fiber glass has significantly high insulation and durability properties. The fiber glass also has dimensional stability, electrical resistance and heat resistance properties. Further, the fiber glass upon impregnation with curable binder resins forms a rigid insulation base, which is useful for making the electrical insulation system for use in electronic and electrical industries.

In some embodiments of the electrical insulating system described herein, the fiber glass is disposed on a first surface of the electrically insulating mica paper. The electrically insulating mica paper and the fiber glass are impregnated with a curable binder resin composition. A prepreg form of the curable binder resin may be used for easy impregnation. A "prepreg form" is an intermediate form of a resin composition, which does form a gel during wrapping, encapsulation, winding, or bonding. For example, the prepreg form of the resin does not undergo sol-gel transition during wrapping of a stator bar. In some embodiments, a prepreg form of the curable binder resin is impregnated in the electrically insulating mica paper and the fiber glass to form an electrically insulating mica tape. In some other embodiments, a prepreg form of the curable binder resin is disposed between the electrically insulating mica paper and the fiber glass to form an electrically insulating mica tape. The prepreg form of the curable binder resin may permeate through the electrically insulating mica paper and the fiber glass. In some embodiments, the electrically insulating mica paper is flexible enough to be wrapped around the conductors of a stator bar. The electrically insulating mica tape having the prepreg form of the curable binder resin, wrapped around the conductors of the stator bar may be subsequently cured to remove air, moisture and other volatiles to form an electrically insulated stator bar. The curing of the electrically insulating mica tape results in an electrical insulating system suitable for use in a high voltage generator.

As illustrated in FIG. 1, the electrically insulating system mica tape 10 is composed of a electrically insulating mica paper 12 supported by pliable backing sheet 18 (e.g., a fiber glass backing). The electrically insulating mica paper 12 has two surfaces, a first surface 14 and a second surface 16. The fiber glass 18 is disposed on the first surface 14 of the electrically insulating mica paper 12. The electrically insulating mica paper 12 and the fiber glass 18 are impregnated with a curable binder resin composition. The curable binder resin composition, in its prepreg form, can permeate through the electrically insulating mica paper 12 and the fiber glass 18 and hold both the electrically insulating mica paper 12 and fiber glass 18 together to form the electrically insulating mica tape 10. As such, the curable binder resin composition affects the properties of the electrically insulating mica tape 10, in its prepreg state and after the curing of a stator bar wrapped with the electrically insulating mica tape 10.

Figure 4:
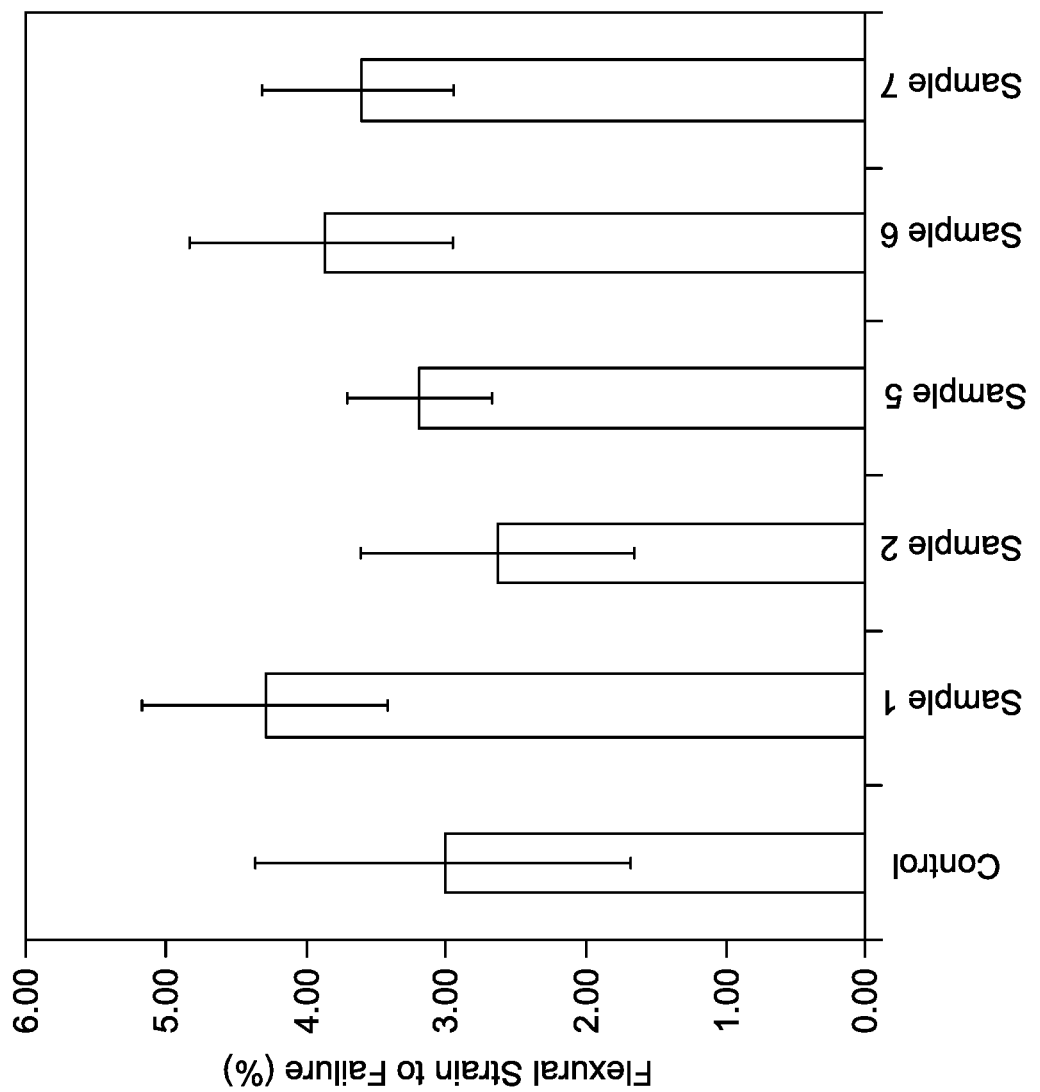
FIG. 4 shows flexural strain to failure for various curable binder resin samples in accordance with one embodiment of the disclosure.
Figure 5:
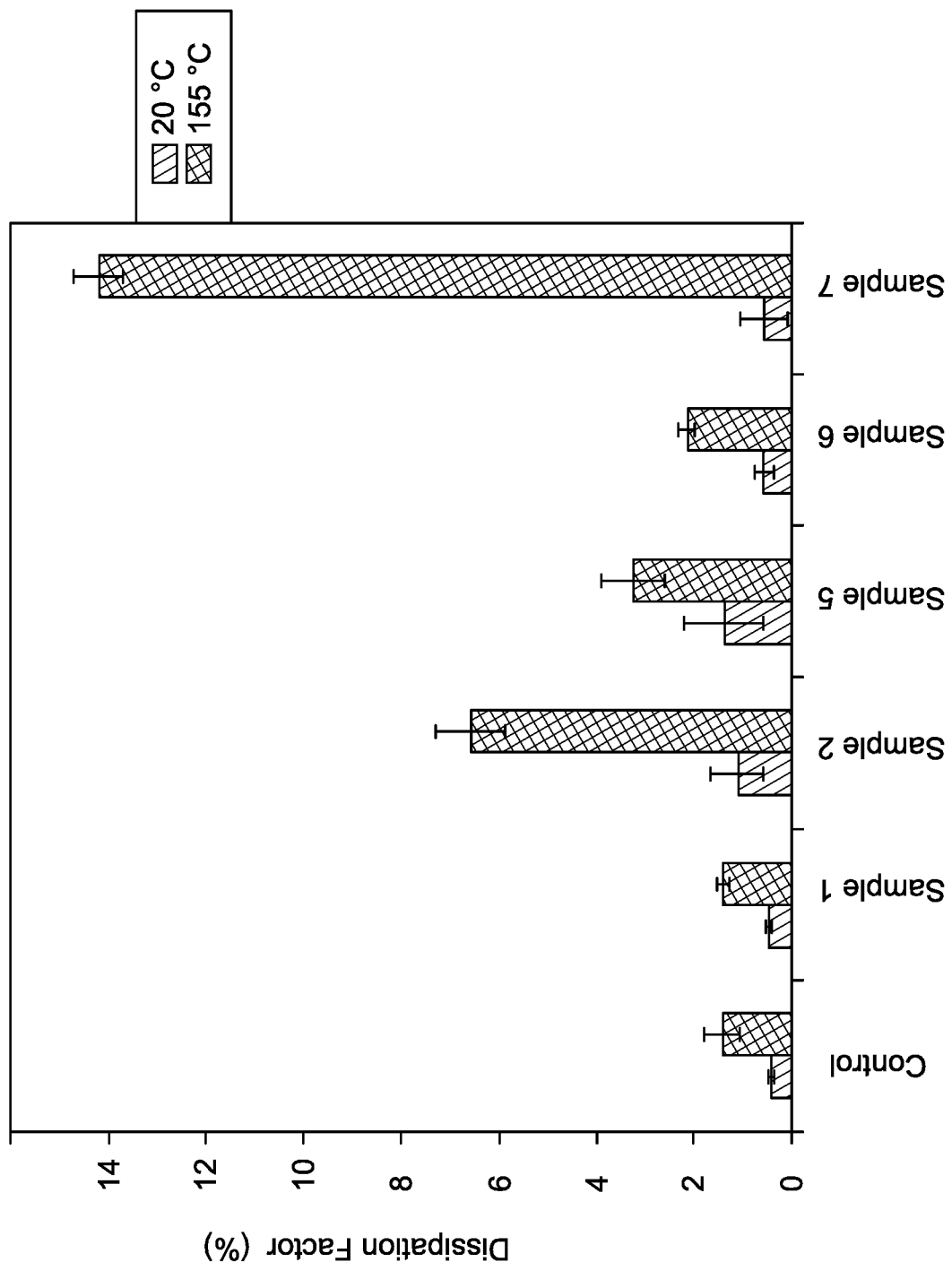
FIG. 5 shows dissipation factor for various curable binder resin samples in accordance with one embodiment of the disclosure.
Figure 6:
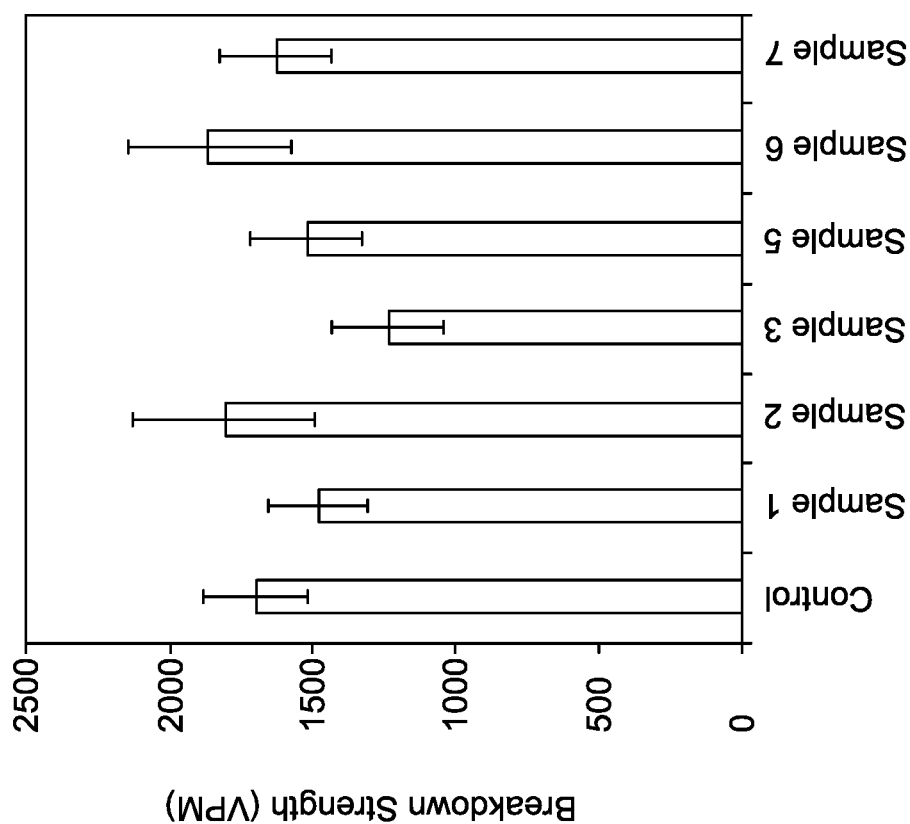
FIG. 6 shows breakdown strength for various curable binder resin samples in accordance with one embodiment of the disclosure.

The toughener in the curable binder resin composition helps to improve the mechanical properties of the electrically insulating mica tape. The presence of the toughener in the curable binder resin composition also improves the mechanical properties of an article such as a stator bar that is being wrapped with the electrically insulating mica tape. Random selection of any traditional tougheners for an epoxy resin blend may not always achieve the required improvements in toughness. For example, often times, the use of a toughener leads to a high dielectric loss, which is detrimental to insulating performance. Further, the selection criteria for the tougheners is also dependent on the compatibility of the individual tougheners with the epoxy resin blend. Various materials were tested for suitability as tougheners in the curable binder resin samples (see, Example 2). The toughness of those curable binder resin samples and the electrically insulating mica tapes formed using these curable binder resin samples were also tested. The curable binder resin samples were also subjected to a number of tests to determine their mechanical properties and dielectric properties (FIGS. 4-6). The tougheners were selected such that they improve the mechanical properties of an electrical insulating system, without significantly reducing the dielectric properties. Desired properties and characteristics were achieved when polyethersulfone or methylmethacrylate butadiene styrene were used as tougheners in the epoxy resin blend. In some embodiments, the curable binder resin composition comprises polyethersulfone, methylmethacrylate butadiene styrene, or a combination of polyethersulfone (PESU) and methylmethacrylate butadiene styrene (MMBS) as tougheners. In one embodiment, the toughener used for the curable binder resin composition is polyethersulfone. In some other embodiments, the toughener employed for the curable binder resin composition is methylmethacrylate butadiene styrene. In some embodiments, a combination of the two tougheners, PESU and MMBS are used.

In one or more embodiments, the concentration of the toughener in the curable binder resin composition ranges from about 2.5 weight percent to about 15 weight percent of the curable binder resin composition. In some embodiments, the concentration of the toughener ranges from about 5 weight percent to about 15 weight percent of the curable binder resin composition. In some other embodiments, the concentration of the toughener ranges from about 8 weight percent to about 12 weight percent of the curable binder resin composition. In some other embodiments, the concentration of the toughener ranges from about 10 weight percent to about 15 weight percent of the curable binder resin composition.

In some example embodiments, the toughener is PESU, wherein the concentration of the PESU ranges from about 5 weight percent to about 10 weight percent of the curable binder resin composition. In some embodiments, the concentration of the PESU ranges from about 8 weight percent to about 10 weight percent of the curable binder resin composition. In some other embodiments, the concentration of the PESU ranges from about 5 weight percent to about 8 weight percent of the curable binder resin composition.

In some other example embodiments, the toughener is MMBS, wherein the concentration of MMBS is in a range of about 10 weight percent to about 15 weight percent of the curable binder resin composition. In some embodiments, the concentration of the MMBS ranges from about 12 weight percent to about 15 weight percent of the curable binder resin composition. In some other embodiments, the concentration of the MMBS ranges from about 10 weight percent to about 12 weight percent of the curable binder resin composition.

The solid or semi-solid epoxy resin constitutes the primary component of the curable binder resin composition. The desirable adhesive properties for a prepreg form of the curable binder resin composition is achieved by using the solid or semi-solid epoxy resin components. Further, the desirable solid or semi-solid consistency of the curable binder resin is achieved by using the solid or semi-solid epoxy resin components. In one embodiment, the solid or semi-solid epoxy resin is an epoxy novolac resin. Non-limiting examples of commercially available epoxy novolac resin include DEN 439, DEN 438 and DEN 485 (DOW Chemicals).

In one or more embodiments, the curable binder resin composition comprises about 21 weight percent to about 73 weight percent of a solid or semi-solid epoxy resin having an epoxide functionality of about 2.5. In certain embodiments, the curable binder resin composition comprises about 30 weight percent to about 60 weight percent of a solid or semi-solid epoxy resin having an epoxide functionality of about 2.5. In some embodiments, the curable binder resin composition comprises about 40 weight percent to about 50 weight percent of a solid or semi-solid epoxy resin having an epoxide functionality of about 2.5. In some embodiments, the solid or semi-solid epoxy resin is epoxy novolac, wherein a concentration of the epoxy novolac resin ranges from about 53 weight percent to about 61 weight percent of the curable binder resin composition. In an example embodiment, a concentration of the epoxy novolac resin ranges from about 54 weight percent to about 58 weight percent of the curable binder resin composition.

In one or more embodiments, the curable binder resin composition comprises about 0.8 weight percent to about 49 weight percent of a liquid epoxy resin. The liquid epoxy resin has an epoxide functionality of about 2. In certain embodiments, the curable binder resin composition comprises about 10 weight percent to about 40 weight percent of a liquid epoxy resin having an epoxide functionality of about 2. In some embodiments, the curable binder resin composition comprises about 20 weight percent to about 30 weight percent of a liquid epoxy resin having an epoxide functionality of about 2. In some embodiments, the liquid epoxy resin is bisphenol A-based epoxy resin. In these embodiments, the concentration of the bisphenol A-based epoxy resin may be in a range from about 23 weight percent to about 26 weight percent of the curable binder resin composition. In an example embodiment, the concentration of the bisphenol A-based epoxy resin may be about 23.5 weight percent of the curable binder resin composition.

The ratio of the concentration of the liquid epoxy resin to the solid or semi-solid epoxy resin may be adjusted if a softer and more pliable sheet material (e.g., an electrically insulating mica tape) is desired. For example, higher amount of liquid epoxy resin may be used to lower the viscosity of the resulting epoxy resin blend. Such an adjustment may be carried out for a specific concentration of the solid or semi-solid epoxy resin without significantly affecting the reactivity of the resin composition or its cured properties. The liquid epoxy resin may be a bisphenol A-based epoxy resin or an F-diglycidyl ether epoxy resin. In one embodiment, the liquid epoxy resin is a bisphenol A-based epoxy resin. The concentration of the bisphenol A-based epoxy resin may be in a range from about 23 weight percent to about 26 weight percent of the curable binder resin composition. In an example embodiment, the liquid epoxy resin is bisphenol A-diglycidyl ether epoxy resin. Non-limiting examples of bisphenol A-diglycidyl ether epoxy resin include Epon 826, Epon 828, Epon 830, commercially available from Shell Chemical Co.

The curable binder resin composition also includes an accelerator. The accelerator may be a bisphenol A-formaldehyde novolac, which is substantially nonreactive at room temperature. A "substantially nonreactive" bisphenol A-formaldehyde novolac means that at least 90% of the bisphenol A-formaldehyde novolac accelerator does not react at room temperature. The bisphenol A-formaldehyde novolac, is catalyzed by an acid catalyst and has a hydroxy equivalent weight of 120. In some embodiments, the curable binder resin composition comprises about 4 weight percent to about 15 weight percent of a bisphenol A-formaldehyde novolac. In some other embodiments, the curable binder resin composition comprises about 6 weight percent to about 12 weight percent of a bisphenol A-formaldehyde novolac. In some other embodiments, the curable binder resin composition comprises about 8 weight percent to about 10 weight percent of a bisphenol A-formaldehyde novolac.

The curable binder resin composition also includes a catalyst, for example, a metal acetylacetonate catalyst. In one embodiment, the metal acetylacetonate catalyst is aluminum acetylacetonate. In one example embodiment, a concentration of the aluminum acetylacetonate is about 0.02 weight percent of the curable binder resin composition.

The curable binder resin composition may be deposited to form a layer or coating on the fiber glass. The curable binder resin composition may also be deposited on the electrically insulating mica paper to form a layer. The layer or coating of curable binder resin composition may be formed either on the fiber glass or on the electrically insulating mica paper by using any known method in the art for deposition. Depending on the requirement of coating formation and subsequent impregnation, the viscosity of the curable binder resin may be modified by varying the concentration of solid epoxy resin or liquid epoxy resin, or by adding a solvent. In some embodiments, the curable binder resin composition may contain epoxy resins of two different types, for example, one with a higher viscosity and another with a lower viscosity.

In some embodiments, the curable binder resin composition may have a higher proportion of solvent and lower viscosity. This type of the curable binder resin is often used for permeation of the curable binder resin inside of the electrically insulating mica paper and fiber glass. The curable binder resin may be applied, for example, between the fiber glass and the electrically insulating mica paper surface, to help permeation through the electrically insulating mica paper and the fiber glass to form an electrically insulating mica tape. In the impregnated form of the electrically insulating mica tape, the curable binder resin may hold the individual flakes of the mica within a paper as well as the fiber glass with the electrically insulating mica paper.

In some other embodiments, the curable binder resin composition may have a lower proportion of solvent and a comparatively higher viscosity (e.g. about 150 cP). In such embodiments, the curable binder resin may stay on the surface of the electrically insulating mica paper and form a coating on the surface of the electrically insulating mica paper. Such coating of the curable binder resin of these embodiments may hold the fiber glass on to the surface of the electrically insulating mica paper. In certain embodiments, a portion of the curable binder resin may form a coating on the surface of the electrically insulating mica paper and another portion of the curable binder resin may permeate through the pores of the electrically insulating mica paper and fiber glass. The curable binder resin may be applied to the electrically insulating mica paper or fiber glass using any suitable technique, including dip coating. In one example embodiment, vapor process impregnation (VPI) may be used to form a thin film coating of the curable binder resin composition on the fiber glass, electrically insulating mica paper or on both the fiber glass and the electrically insulating mica paper. The VPI technique may be cost-effective and provide improved heat transfer.

Figure 2:
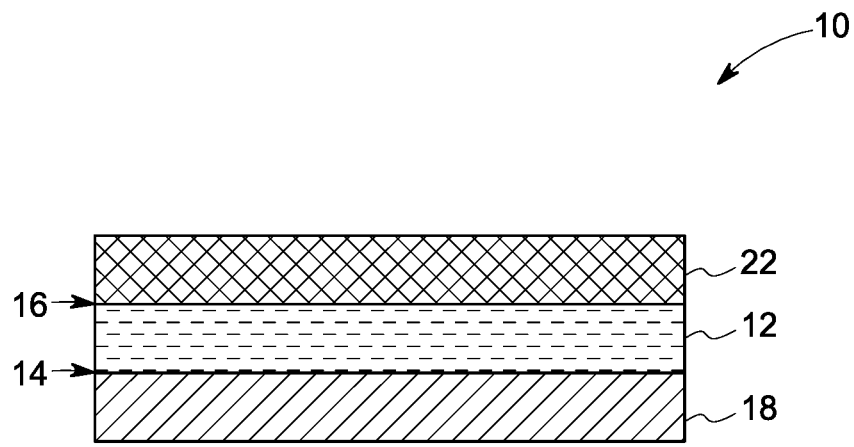
FIG. 2 is a schematic representation of a cross-sectional view of an electrically insulating mica tape in accordance with one embodiment of the disclosure.

In some embodiments, the electrical insulating system further comprises a polyethylene terephthalate layer disposed on a second surface of the electrically insulating mica paper. As illustrated in FIG. 2, the electrically insulating mica tape 20 may be composed of an electrically insulating mica paper 12 supported by a single woven fiber glass backing 18, wherein an additional layer 22 is disposed on the second surface 16 of the electrically insulating mica paper 12. In some embodiments, the additional layer 22 is a polyethylene terephthalate layer. The curable binder resin composition may permeate through the electrically insulating mica paper 12 and the fiber glass 18 and hold both of the electrically insulating mica paper 12 and fiber glass 18 together by forming the electrically insulating mica tape 20. The additional layer of polyethylene terephthalate is disposed on the electrically insulating mica paper. The polyethylene terephthalate helps by increasing the tensile strength of the electrically insulating mica tape.

One or more embodiments of the present disclosure are directed to insulated components of an electrical machine using the electrical insulating systems. The electrical insulating system comprises an electrically insulating mica tape that is suited for use as a prepreg electrical insulating material for electrical equipment and components such as a groundwall insulation of a high voltage generator stator bar. The electrically insulating mica tape provides improved voltage endurance as compared to existing groundwall insulation systems. Further, the electrically insulating mica tape provides improved mechanical properties, such as increased toughness, without significantly compromising the dielectric properties of the electrical insulation system. The electrically insulating mica tape includes an electrically insulating mica paper and a fiber glass that are impregnated with a curable binder resin composition. The electrically insulating mica tape may be partly cured such that an intermediate form of the curable binder resin, a prepreg form, is generated, which may then be used to insulate an electrical component. The mica tape that comprises a prepreg form of the curable binder resin composition is referred herein as a "prepreg electrically insulating mica tape".

In one embodiment, a stator bar comprises a plurality of conductors arranged in a group and a groundwall insulation surrounding the group of the plurality of conductors. The groundwall insulation comprises one or more layers of an electrically insulating mica tape. The electrically insulating mica tape includes an electrically insulating mica paper and a fiber glass disposed on a first surface of the electrically insulating mica paper, wherein the electrically insulating mica paper is bound to the fiber glass via a cured form of a curable binder resin composition. The curable binder resin composition comprises about 21 weight percent to about 73 weight percent of a solid or semi-solid epoxy resin, about 0.8 weight percent to about 49 weight percent of a liquid epoxy resin, about 4 weight percent to about 15 weight percent of a bisphenol A-formaldehyde novolac, a metal acetylacetonate catalyst, and about 2.5 weight percent to about 15 weight percent of a toughener selected from polyethersulfone, methylmethacrylate butadiene styrene, or a combination of polyethersulfone and methylmethacrylate butadiene styrene. The solid or semi-solid epoxy resin has an epoxide functionality of about 2.5, and the liquid epoxy resin has an epoxide functionality of about 2.

In some embodiments, the curable binder resin composition used for the stator bar insulation comprises polyethersulfone as a toughener. In some embodiments, the concentration of the toughener ranges from about 5 weight percent to about 10 weight percent of the curable binder resin composition. In some other embodiments, the curable binder resin composition used for the stator bar comprises methylmethacrylate butadiene styrene as the toughener. The concentration of the methylmethacrylate butadiene styrene may range from about 11 weight percent to about 15 weight percent of the curable binder resin composition. In some embodiments, the solid or semi-solid epoxy resin employed for the curable binder resin composition is an epoxy novolac resin. The concentration of the epoxy novolac resin may be in a range from about 53 weight percent to about 61 weight percent of the curable binder resin composition. In some embodiments, the liquid epoxy resin employed for the curable binder resin composition is a bisphenol A-based epoxy resin, wherein concentration of the bisphenol A-based epoxy resin ranges from about 23 weight percent to about 26 weight percent of the curable binder resin composition.

In some embodiments, the ground wall insulation of the stator bar is made by wrapping of the group of conductors with one or more layers of prepreg electrically insulating mica tape and subsequently curing the curable binder resin composition in the prepreg electrically insulating mica tape. The stator bar may further include a suitable insulating material to provide a primary insulation system. The stator bar may be made of copper or aluminum. The prepreg electrically insulating mica tape is suitable for wrapping the group of conductors of a stator bar due to its flexibility. The curing of the prepreg electrically insulating mica tape wrapped group of conductors of the stator bar results in 1) bonding of the electrically insulating mica paper and the fiber glass by a cured form of the curable binder resin composition, and 2) bonding of the group of conductors of the stator bar to the cured electrically insulating mica tape. In some embodiments, the electrically insulating mica paper is bound to the fiber glass via a cured form of a curable binder resin composition. In these embodiments, the electrically insulating mica tape wrapped conductors of the stator bar is cured at high temperature, which results in a bonded structure of the electrically insulating mica paper and the fiber glass. Up on curing, the prepreg form of the electrically insulating mica tape gets converted to a hardened form of the electrically insulating mica tape, wrapped around conductors of the stator bar. The cured form of the electrically insulating mica tape-wrapped conductors of the stator bar is an electrically insulated stator bar that is suitable for use in a high voltage generator.

Figure 3:
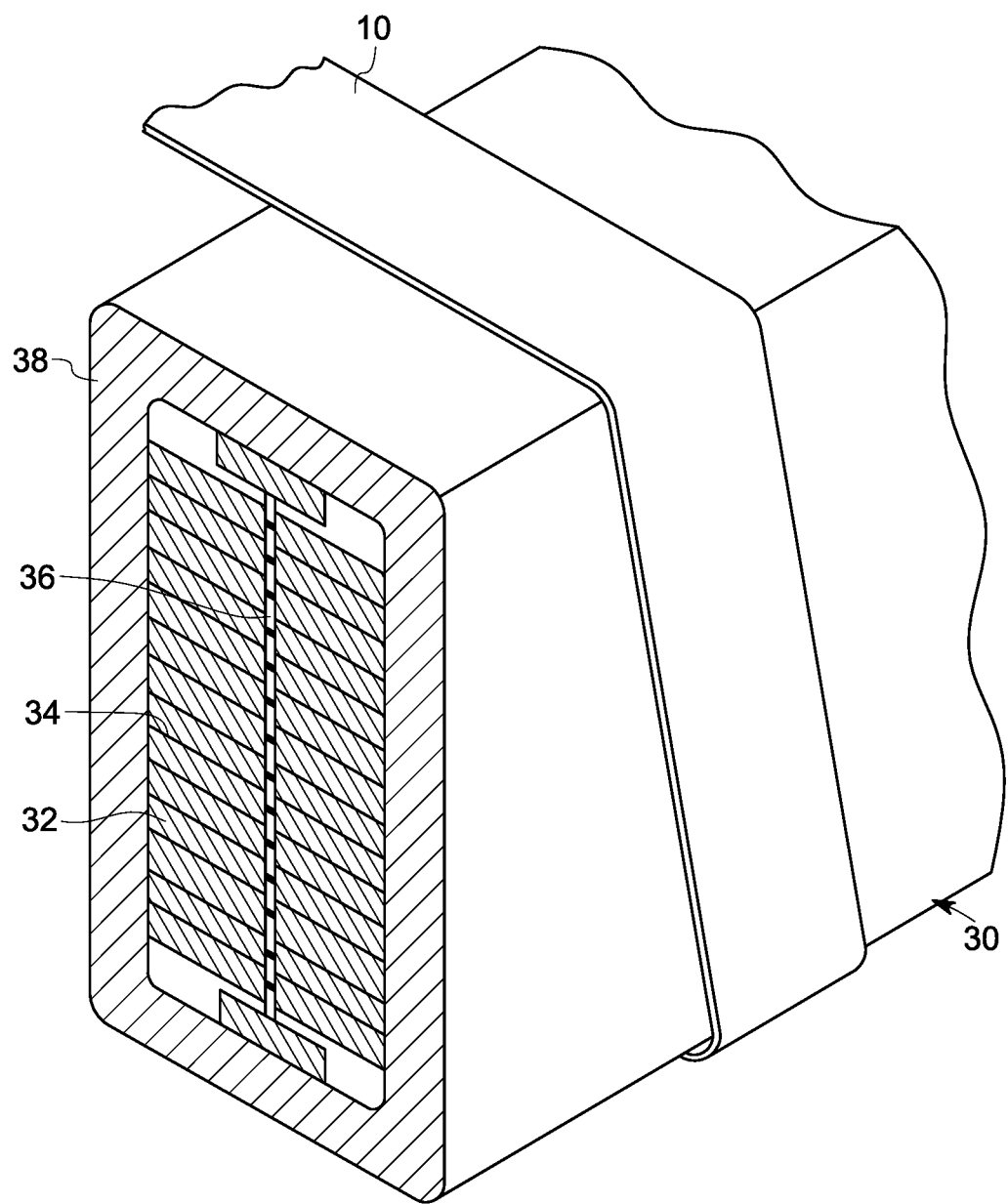
FIG. 3 shows a cross-sectional view of a portion of a stator bar wrapped with an electrically insulating mica tape in accordance with one embodiment of the disclosure.

FIG. 3 illustrates an electrically insulated stator bar 30. The stator bar 30 is composed of a number of conducting copper strands 32 that are insulated from each other by strand insulation 34. In addition, the conductor strands 32 are arranged to form two arrays that are separated by a strand separator 36. Surrounding both arrays is a ground wall insulation 38 formed by multiple wrappings of an electrically insulating mica tape 10 manufactured in accordance with some embodiments of the present disclosure. As illustrated in FIG. 3, the ground wall insulation of the stator bar 30 is provided by wrapping one or more layers of electrically insulating mica tape 10 around a group of the plurality of conductors. Generally, a plurality of layers of the electrically insulating mica tape-based insulating system 10 are used for wrapping around the group of the plurality of conductors depending upon voltage requirements. Such electrically insulating mica tape 10 may be a paper or felt of laid down small mica flakes. As noted above, the ground wall insulation in the stator bar may be achieved by wrapping one or more layers of electrically insulating mica tape around the group of the plurality of conductors of the stator bar. In certain embodiments, the ground wall insulation comprises 12 to 20 layers of electrically insulating mica tape. In these embodiments, 12 to 20 layers of electrically insulating mica tape are wrapped around the group of the plurality of conductors of the stator bar to provide desired insulation properties. In some other embodiments, the ground wall insulation comprises 15 to 20 layers of electrically insulating mica tape. In some other embodiments, the ground wall insulation comprises 17 to 20 layers of electrically insulating mica tape. The electrically insulating mica tape may be applied half lapped, abutted or otherwise.

The curable binder resin composition used for making the electrically insulating mica tape may be cured according to any suitable curing technique. In some embodiments, the curable binder resin composition may be cured by heating at a temperature in a range from about 18° C. to about 120° C. In certain embodiments, a temperature in a range from about 50° C. to about 150° C. may be used for curing of the curable binder resin. The time span required for curing may vary depending on the end application of the stator bar. For example, the time span required may vary depend upon the thickness of the stator bar which includes the electrically insulating mica tape wrapped conductors. In some embodiments, the time span sufficient for curing the binder resin composition may be in a range from about 2 hours to about 12 hours.

In embodiments wherein the cured composition is used to make electrically insulating mica tape, it may be desirable to apply pressure during the heat curing step. One example of the curing method is vacuum pressure impregnation method, in which a stator bar containing the plurality of conductors wrapped by the electrically insulating mica tape is placed inside a pressure vessel under a high vacuum that draws out entrapped air and other gases. The stator bar including the electrically insulating mica tape wrapped conductors is introduced into the pressure vessel and the entire vessel is pressurized, typically to at least 90 psi or higher to achieve a total penetration of the stator bar. In one embodiment, the curing of the stator bar having an electrically insulating mica tape wrapped around its conductors is achieved using an autoclave. The suitable curing techniques may include trickle treat in some embodiments. In some other embodiments, microwave, radio frequency, ionizing radiation, electron beams, or combinations thereof may be used to affect the curing step.

The components of the epoxy resin blend of the curable binder resin composition may get cross-linked on curing and provide the desired hardness, electrical insulation and toughening properties. Further, the solid or semi solid epoxy resin may be blended with the liquid epoxy resin in a ratio such that the curable binder resin composition provides the desired viscosity for processing. However, the cured composition, which is formed after cross-linking of the epoxy resin blend is typically rigid, and may be susceptible to crack formations during use at high temperatures. Toughening materials, such as, the PESU or MMBS are added to improve the mechanical properties of the composition, while maintaining the viscosity of the curable composition and desired dielectric properties. The toughening material may react with the epoxy resins (solid, semi-solid or liquid) and may form a homogeneous cross-linked structure with longer chains to provide the improved mechanical properties.

By controlling the relative amounts of solid or semi-solid epoxy resin, liquid epoxy resin, accelerator, catalyst and toughener, the desired combination of properties (such as, electrical insulation, heat dissipation, flexural strength, fracture toughness, and viscosity) for the electrical insulating system may be achieved. The curable composition may be "substantially solvent-free" means the curable composition does not contain more than 10% of solvent. An electrically insulating mica paper is used to form an electrically insulating mica tape with desired electrical insulation properties. A fiber glass provides a suitable backing for the electrically insulating mica paper to form the electrically insulating mica tape and also serves an electrical insulating material.

By curing the stator bar including the one or more layers of the electrically insulating mica tape wrapped around the group of conductors an insulated stator bar having desired properties, such as flexural strain, heat dissipation factor or electrical breakdown strength is generated.

Figure 7:
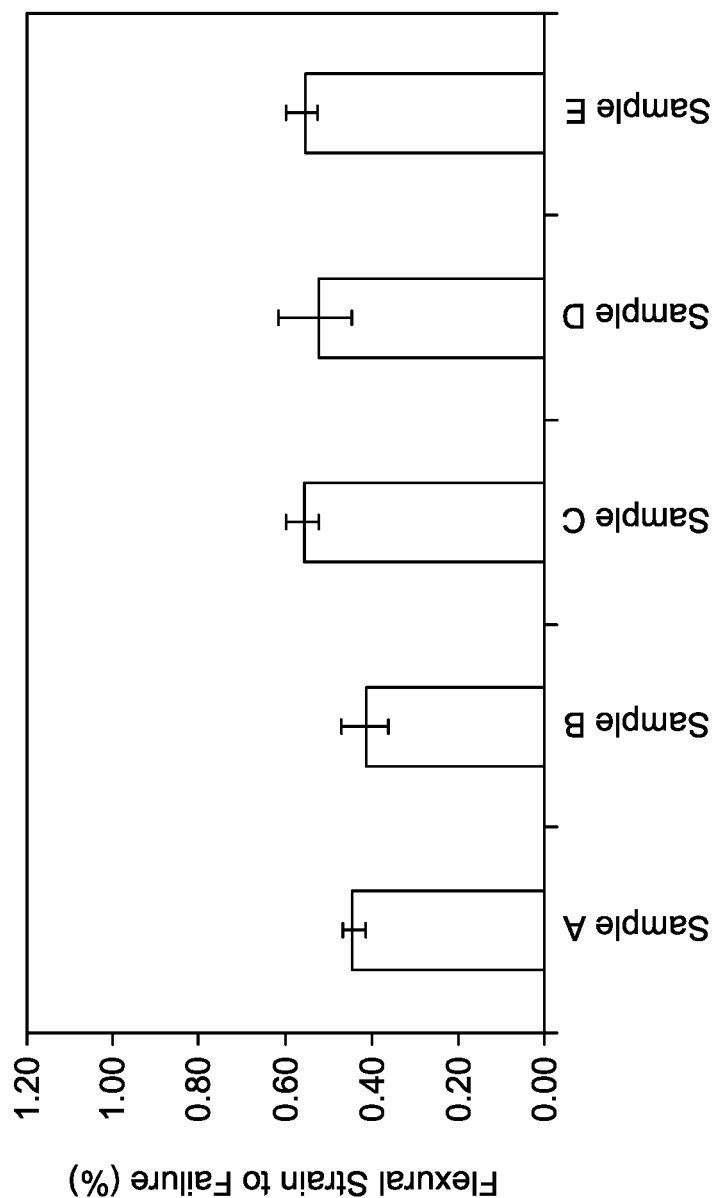
FIG. 7 shows flexural strain to failure for bars wrapped with electrically insulating mica tapes including various curable binder resin compositions in accordance with one embodiment of the disclosure.

The effect of specific tougheners can be determined by measuring the flexural strain to failure of different curable binder resin samples (as shown in FIG. 4) or the electrically insulated stator bar generated after curing (as shown in FIG. 7). The electrically insulated stator bar has a flexural strain to failure in a range from about 0.4% to about 0.9% (FIG. 7). The flexural strain testing is generally based on ASTM standard D790.

Figure 8:
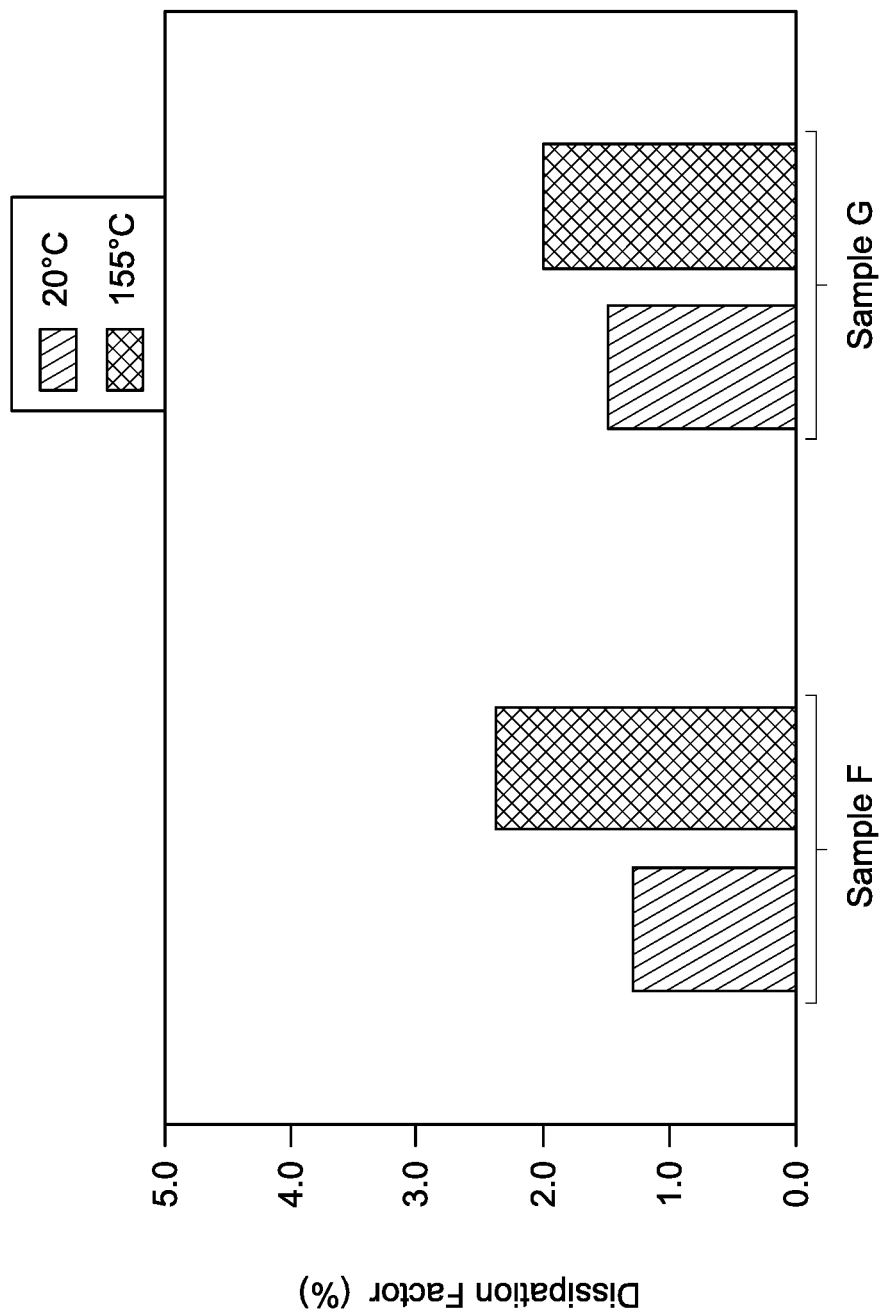
FIG. 8 shows percent dissipation factors for bars wrapped with electrically insulating mica tapes including various curable binder resin compositions at 20° C. and at 155° C. in accordance with one embodiment of the disclosure.

The cured form of the curable binder resin composition and the stator bar including the electrically insulating mica tape are characterized by determining heat dissipation factor (DF), expressed as a percentage. A low value of dissipation factor indicates low dielectric losses. The DF may be determined at room temperature (e.g., 20° C.) or at a higher temperature (e.g., 155° C.). Determination of heat dissipation factor at higher temperature is more significant as the insulated stator bar used for generator generally runs at high temperature (e.g., 120° C.). The effect of specific tougheners can be determined by measuring the DF of different curable binder resin samples as shown in FIG. 5. In certain embodiments, the stator bar has a heat dissipation factor in a range from about 3% to about 6% at 155° C. as shown in FIG. 8.

Figure 9:
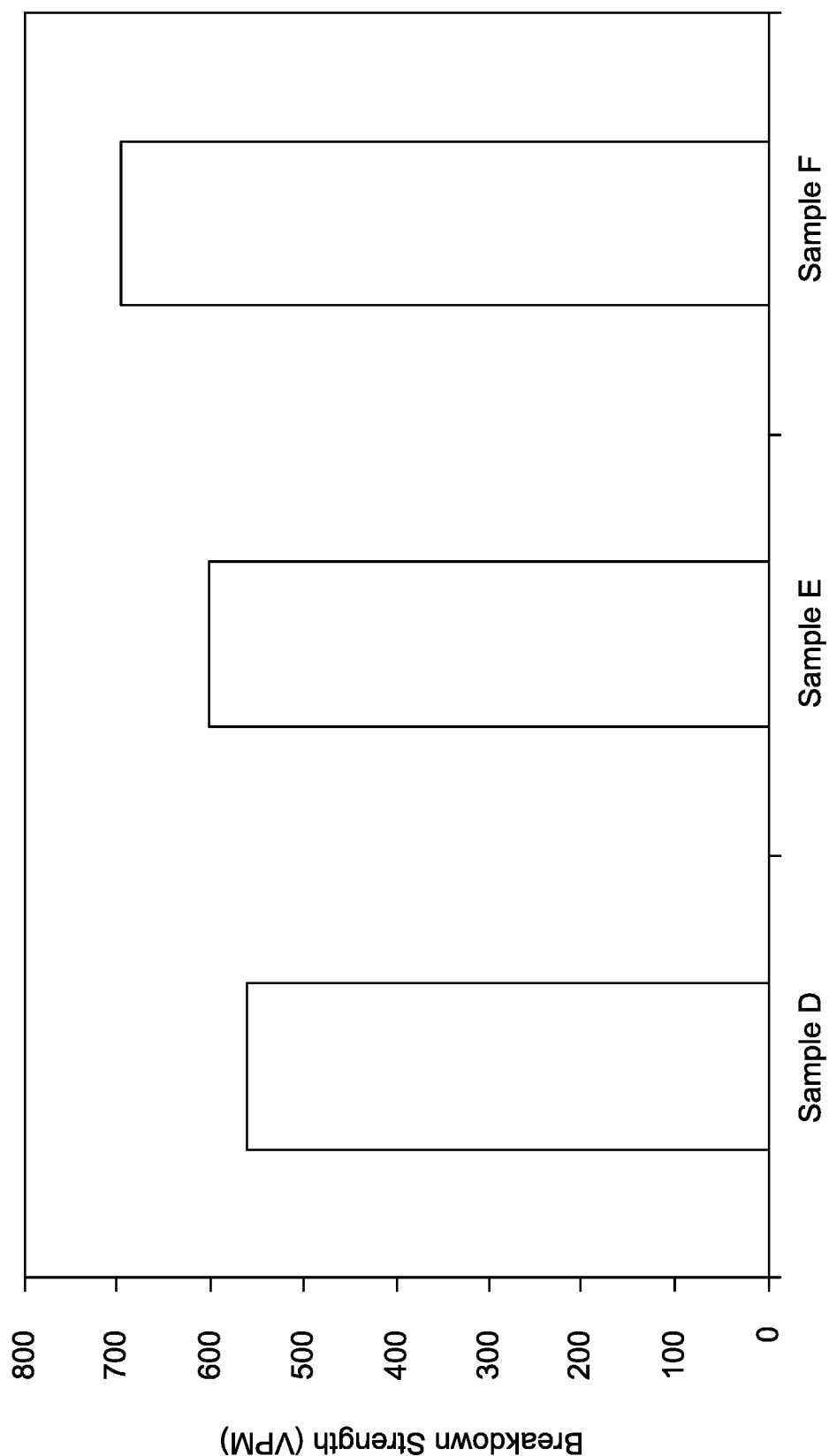
FIG. 9 shows breakdown strength for bars wrapped with electrically insulating mica tapes including various curable binder resin compositions in accordance with one embodiment of the disclosure.

The breakdown strength of the cured form of the curable binder resin composition (FIG. 6) and the electrically insulated stator bar having cured electrically insulating mica tape wrapped around the plurality of conductors (FIG. 9) may also be determined under an applied voltage. To determine breakdown strength, typically, the dielectric breakdown resistance of the electrically insulated stator bar is measured. A higher value of breakdown strength represents better quality of the insulated stator bar. In some embodiments, the stator bar as described herein has an electrical breakdown strength in a range from about 500 VPM to about 2000 VPM. In some other embodiments, the stator bar has an electrical breakdown strength in a range from about 1000 VPM to about 2000 VPM. In some embodiments, the stator bar has an electrical breakdown strength in a range from about 1500 VPM to about 2000 VPM. In some exemplary embodiments, the stator bar has an electrical breakdown strength in a range from about 500 VPM to about 800 VPM (FIG. 9).

EXAMPLES

Materials: Epoxy novolac resin (DEN 439) was purchased from Dow Chemicals, Bisphenol A formaldehyde novolac was purchased from Hexion, Aluminum acetylacetonate was purchased from Sigma Aldrich, Methyl ethyl ketone (MEK) solvent and bisphenol A based epoxy resin (Epon 826) were purchased from Shell Chemicals Co. Toughener polyether sulfone 10200 (VW™ 10200) was purchased from Virantage®, and tougheners acrylate core shell rubber EXL2300G (PARALOID™ EXL2300G), methylmethacrylate butadiene styrene core shell rubber (PARALOID™ TMS-2670), and polyol derivative (Fortegra™ 100) were purchased from Dow Chemicals, tougheners silicone core shell rubber (Albidur® EP 2240) and epoxy-silicone copolymer (Albiflex®) were purchased from Evonik, and toughener polymethylmethacrylate-polybutylacrylate copolymer (M51) was purchased from Nanostrength®.

Example 1: Preparation of a Curable Binder Resin Composition

Different samples of curable binder resin composition were made by combining an epoxy resin blend and a toughener. The epoxy resin blend was made by mixing about 54.2 wt % DEN 439, about 23.3 wt % Epon 826, about 8.6 wt % Bisphenol A formaldehyde novolac, about 8.8 wt % EPON 826 with 2.4% aluminum acetylacetonate and 20% MEK (solvent) in a flask. The aluminum acetylacetonate catalyst sample was prepared by adding aluminum acetylacetonate to a portion of the Epon 826, wherein the concentration of aluminum acetylacetonate was 2.4% of the Epon 826/aluminum acetylacetonate blend. The final concentration of aluminum acetylacetonate was 0.2 wt % of the curable binder resin composition, when the total concentration of EPON 826 with aluminum acetylacetonate was 8.8 wt % of the curable binder resin composition. To the epoxy resin blend, about 5 wt % toughener was added, followed by heating and stirring the mixture at about 90° C. The solvent was removed under vacuum using a rotary evaporator. The curable binder resin composition was poured into a mold for curing.

The curable binder resin composition was cured in an oven by heating the curable binder resin composition to approximately 100° C. for about 40 minutes followed by incubating at 100° C. for 1 hour. The temperature was then raised from 100° C. to 170° C. in 35 minutes, the curable binder resin composition was incubated at 170° C. for approximately 10 hours. The curable binder resin composition was then allowed to cool from 170° C. to 30° C. in 5 hours.

Example 2: Selection of Suitable Tougheners for the Curable Binder Resin Composition Various tougheners were employed for making different curable binder resin composition samples, which are listed in Table 1. The samples were prepared and cured as described in EXAMPLE 1. For tougheners Albidur and Albiflex, DEN 439 was first heated to 90° C. followed by pouring into a flask, where the remaining components of the curable binder resin composition (except toughener) were added. 140 g of MEK solvent was added to the mixture followed by mixing for 1 hour at 90° C. The mixture was cured as described in EXAMPLE 1. Concentrations of different components in each of the samples listed in Table 1 are represented in weight % (wt %). In each of the samples, the toughener concentration was 5 wt % except for sample 3, wherein the toughener (Albidur 2240) concentration was 12 wt %. A control sample that is devoid of any toughener was prepared in a similar manner (EXAMPLE 1) with the same constituents as of sample 1 except the toughener.

TABLE 1

Different samples of curable binder resin compositions.

| Sample No. | DEN 439 | Bisphenol A formaldehyde novolac | EPON 826 | EPON 826 with 2.4% Aluminum AcAc | Toughener |
|---|---|---|---|---|---|
| C (control) | 57.24 | 9.65 | 24.28 | 8.84 | None |
| 1 | 54.24 | 8.65 | 23.28 | 8.84 | PESU 10200 |
| 2 | 54.24 | 8.65 | 23.28 | 8.84 | EXL2300G |
| 3 | 60.33 | 8.62 | 9.72 | 8.83 | Albidur 2240 |
| 4 | 61.01 | 8.72 | 16.34 | 8.93 | Albiflex |
| 5 | 54.24 | 8.65 | 23.28 | 8.84 | Fortegra100 |
| 6 | 54.24 | 8.65 | 23.28 | 8.84 | TMS 2670 |
| 7 | 54.24 | 8.65 | 23.28 | 8.84 | M51 |

Various mechanical properties of the curable binder resin composition samples listed in Table 1 were measured, and are listed in Table 2. Based on the improvement in mechanical properties, the tougheners PESU (PESU 10200) and MMBS (TMS 2670) were selected for formulating the curable binder resin composition that are suitable for impregnating electrically insulating mica tape. In Table 2, "*" represents that a referenced property was not measured for a particular sample since the sample was already taken out of consideration for the current application due to its other undesirable properties. For example, Dissipation Factor and Flexural Strain of Sample No. 3 were not measured since the sample had shown a tendency to crack, which is undesirable for the subject application.

TABLE 2

Effect of different tougheners on different mechanical properties

| Sample no. | Tougheners | Dissipation Factor | Flexural Strain | Break Down Strength | Crack formation |
|---|---|---|---|---|---|
| Control | Absent | <2% at RT<br><5% at 155° C. | 3% | 1500 VPM | Not observed |
| 1 | PESU 10200 | <1% at RT<br><2% at 155° C. | 4.25% | 1500 VPM | Not observed |
| 2 | EXL2300G | >7% at 155° C. | * | * | Not observed |
| 3 | Albidur 2240 | * | * | 1250 VPM | Tendency to crack |
| 4 | Albiflex | * | * | * | Cured sample cracked |
| 5 | Fortegra ™ 100 | >10% at 155° C. | * | * | Not observed |
| 6 | TMS 2670 | <1% at RT<br><2% at 155° C. | 4% | 1800 VPM | Not observed |
| 7 | M51 | >15% at 155° C. | * | * | Not observed |

Example 3: Generation of an Electrically Insulated Stator Bar

The electrically insulating mica tape was formed by applying the curable binder resin was composition to a composite structure of an electrically insulating mica paper and a fiber glass, wherein the fiber glass was disposed on the first surface of the electrically insulating mica paper. The application of curable binder resin composition forms a prepreg form of the electrically insulating mica tape. The prepreg from of the electrically insulating mica tape is flexible, suitable to wrap the group of conductors of a stator bar to provide samples for bar-test. The prepreg electrically insulating mica tape was wound onto the group of conductors of an aluminum bar with total of 10-14 layers, wherein the electrically insulating mica tape was applied half lapped. Then, the aluminum bar including 10-14 layers of electrically insulating mica tape was thermally cured in autoclave to make the electrically insulated stator bar. The curing was achieved by heating the electrically insulating mica tape wrapped conductors to about 80° C.-140° C. at the rate between about 0.14° C./min to about 0.24° C./minute for about 8 hours, during the vacuum cycle. The temperature is then raised quickly to about 165° C. for about 8 hours to allow curing. In bar-test, the samples of stator bar made of using different compositions of the curable binder resin were tested for their physical properties.

Characterizations of the curable binder resin and insulated stator bar: Various curable binder resin composition used for bar test in Examples 4 (FIG. 7), 5 (FIG. 8), 6 (FIG. 9) and 9 (FIG. 10) are provided in Table 3.

TABLE 3

Various curable binder resin compositions used for bar test for Examples 4, 5, 6 and 9.

| Components (wt %) | DEN 439 | Bisphenol A formaldehyde novolac | Epon 826 | Epon 826 with 2.4% Aluminum Ac—Ac | Toughener |
|---|---|---|---|---|---|
| Sample A | 57.1 | 9.1 | 33.57 | 0.23 | 0 |
| Sample B | 63.5 | 9.1 | 27.17 | 0.23 | 0 |
| Sample C | | 95% resin of sample B | | | 5% PESU |
| Sample D | | 90% resin of sample A | | | 10% PESU |
| Sample E | | 90% resin of sample A | | | 10% TMS |
| Sample F | | 95% resin of sample A | | | 5% PESU |
| Sample G | | 95% resin of sample A | | | 5% TMS |

Example 4: Measurement of Flexural Strain to Failure

Flexural strain testing was based on ASTM standard D790. For flexural testing of curable binder resin samples of table 1, the samples were cast in a rectangular aluminum mold with a rectangular cavity and thermally cured in an oven. After curing the samples, the samples were polished to final dimensions for flexural testing per ASTM D790 standard. A flexural strain to failure was measured for each of the resultant cured curable binder resin compositions as shown in FIG. 4. The samples C (control), 1, 2, 5, 6 and 7, as described in Table 1, were used for determining a flexural strain to failure for a curable binder resin composition. The toughener 10200 PESU (sample 1) and TMS 2670 (sample 6) showed higher value for flexural strain to failure, approximately 4.2% and 3.8% respectively.

To evaluate the flexural properties of the cured electrically insulated stator bar samples comprising the electrically insulating mica paper, fiberglass, and curable binder resin composition, the test samples were prepared by cutting off small pieces with dimensions approximately 1 inch×5 inch× 0.15 inch from the aluminum bar followed by curing for the flexural testing. The resultant cured electrically insulated stator bar showed a flexural strain to failure in a range from about 0.4% to about 0.9% (FIG. 7). The samples A, B, C, D and E, as described in Table 3, were used for determining a flexural strain of an insulated stator bar.

Example 5: Measurement of Dissipation Factor (DF)

The curable binder resin samples were prepared as described above, except that the samples were casted in circular disc shape than rectangular bar shape. Gold electrodes were sputtered onto the test samples for better electrode contact. The tests were performed using a dielectric spectrometer at 60 Hz. FIG. 5 shows percent DF for different samples of curable binder resin compositions, tested at 20° C. and at 155° C. Samples C, 1-2, and 5-7, as described in Table 1, were subjected for DF analysis. The samples 2 and 7 have DF higher than a threshold value. The curable binder resin compositions including M51 (sample 7) and EXL2300G (sample 2) tougheners showed high values of percent DF, which were not considered suitable for present insulating system.

For testing the dissipation factor of various electrically insulating mica tape samples, the aluminum bars wrapped with electrically insulating mica tape samples were used as the test specimens. After the electrically insulating mica tape wrapped conductors of the aluminum bars were cured by autoclaving, silver electrode and guarding electrodes were applied on the electrically insulating mica tape wrapped conductors of the aluminum bar for testing energy dissipation at 60 Hz at different voltage levels. The percent dissipation factors for the resultant cured electrically insulating aluminum bar was in a range from about 1.2% to about 1.5% at room temperature (RT) and in a range from about 2% to about 2.5% at 155° C. (high temperature or HT) (as shown in FIG. 8). Samples F and G, as described in Table 3, were used for determining DF of an insulated stator bar.

Example 6: Measurement of Breakdown Strength (BDS)

The sample preparation for determining BDS was identical to the method of EXAMPLE 4. A test voltage of 5 kilovolts with 1 minute hold was applied for each step to the different curable binder resin samples. The voltage was increased until the final electrical breakdown failure occurred. Different samples were tested for BDS, most of the samples crossed the threshold value of 1500 vpm as shown in FIG. 6. In FIG. 6, samples C, 1-3, and 5-7, as described in Table 1, were tested for determining BDS of the curable binder resin composition. The samples with different concentrations of various tougheners were used. Sample 3 has BDS less than a threshold value.

For BDS test of insulated bar, the aluminum bar of 140 cm long having rectangular cross section area was wrapped with the electrically insulating mica tape to achieve overall thickness of around 4 mm. The electrically insulating mica tape was applied half lapped. In general, about 11-18 layers of electrically insulating mica tape were disposed on the conductor bar to achieve the overall thickness of about 4 mm for insulation. After the bar was wrapped, it was subjected to curing in an autoclave to form an insulated bar. After curing, the electrodes and stress grading paint were applied onto the insulated bar before performing the breakdown test. For the breakdown test, the applied test voltage was 5 kilovolts with 1 minute hold time for each step. The voltage was increased until the final electrical breakdown failure occurred. Different samples of insulated bar were tested for BDS. For example, samples D, E and F were used, as described in Table 3, for measuring BDS of an insulated stator bar, which crossed the threshold value of 500 vpm as shown in FIG. 9.

Example 7: Cracking of Curable Binder Resin Sample During Curing Process

The curable binder resin samples of Table 1 were casted in rectangular aluminum mold with rectangular cavity and thermally cured in an oven as described in EXAMPLE 1. The curable binder resin samples were subjected to incubation at 170° C. for 5 hours. Two samples, 3 and 4 of Table 2 showed tendency to crack and crack formation, respectively.

Example 8: Evaluating Interfacial Bond Strength Between Layers

Figure 10:
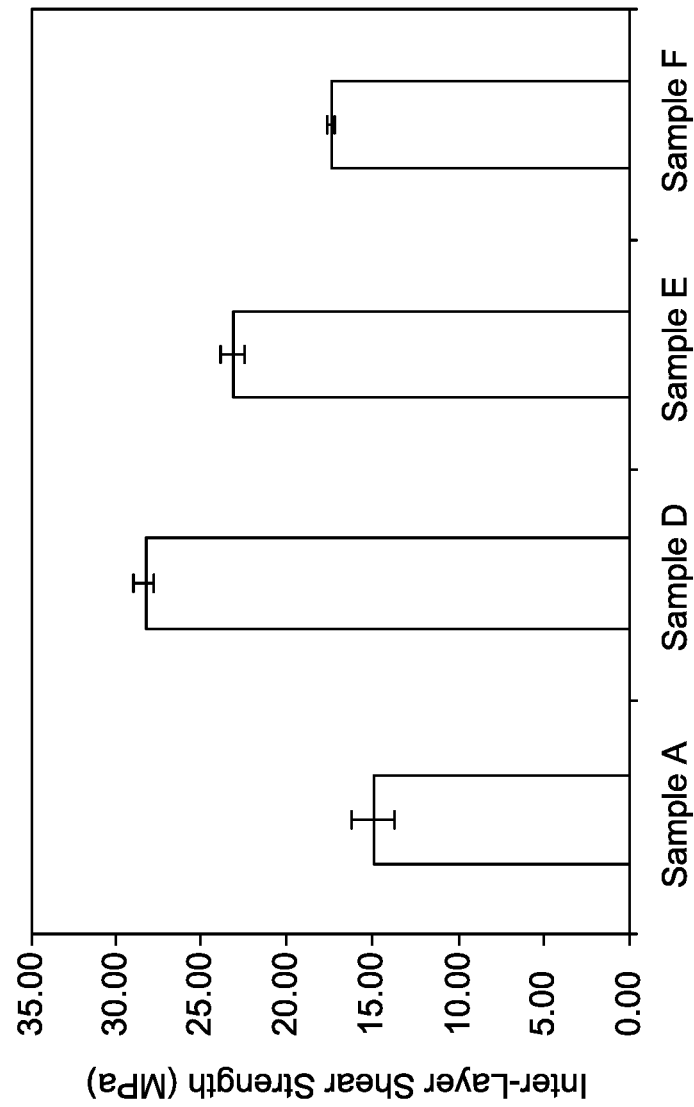
FIG. 10 shows inter-layer shear strength for bars wrapped with electrically insulating mica tapes including various curable binder resin compositions in accordance with one embodiment of the disclosure.

Interlaminar test was based on ASTM test standard D2344. Test samples were prepared as described in Example 6. Each of the samples for interlaminar test was cut off from insulated aluminum bar of 4 mm thick, polished to final dimensions and tested per ASTM D2344 standard. The bar was loaded in three-point bending. This test determined the strength of the insulated bar by evaluating interfacial bond strength between different layers. Results for different samples are illustrated in FIG. 10. Samples A, D, E and F, as described in Table 3, were used for determining interlayer shear strength. Sample D showed higher inter-layer shear strength compared to sample A, sample E, and sample F.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical insulating system, comprising:
   (a) an electrically insulating mica paper; and
   (b) a fiber glass disposed on a first surface of the electrically insulating mica paper,
   wherein the electrically insulating mica paper and the fiber glass are impregnated with a curable binder resin composition, wherein the curable binder resin composition comprises:
   21 weight percent to 73 weight percent of a solid or semi-solid epoxy resin having an epoxide functionality of 2.5;
   0.8 weight percent to 49 weight percent of a liquid epoxy resin having an epoxide functionality of 2;
   4 weight percent to 15 weight percent of a bisphenol A-formaldehyde novolac;
   a metal acetylacetonate catalyst; and
   2.5 weight percent to 15 weight percent of a toughener selected from the group consisting of polyethersulfone, methylmethacrylate butadiene styrene, and a combination thereof.

2. The electrical insulating system of claim 1, wherein concentration of the toughener ranges from 5 weight percent to 15 weight percent of the curable binder resin composition.

3. The electrical insulating system of claim 1, wherein the toughener is polyethersulfone.

4. The electrical insulating system of claim 3, wherein concentration of the polyethersulfone ranges from 5 weight percent to 10 weight percent of the curable binder resin composition.

5. The electrical insulating system of claim 1, wherein the toughener is methylmethacrylate butadiene styrene, and wherein concentration of methylmethacrylate butadiene styrene ranges from 10 weight percent to 15 weight percent of the curable binder resin composition.

6. The electrical insulating system of claim 1, wherein the solid or semi-solid epoxy resin is an epoxy novolac resin, and wherein concentration of the epoxy novolac resin ranges from 53 weight percent to 61 weight percent of the curable binder resin composition.

7. The electrical insulating system of claim 6, wherein the liquid epoxy resin is a bisphenol A-based epoxy resin, and wherein concentration of the bisphenol A-based epoxy resin ranges from 23 weight percent to 26 weight percent of the curable binder resin composition.

8. The electrical insulating system of claim 7, wherein the metal acetylacetonate catalyst is aluminum acetylacetonate, and wherein concentration of the aluminum acetylacetonate is 0.02 weight percent of the curable binder resin composition.

9. The electrical insulating system of claim 1 further comprising polyethylene terephthalate layer disposed on a second surface of the electrically insulating mica paper.

10. A stator bar comprising:
    a plurality of conductors arranged in a group; and
    a groundwall insulation surrounding the group of the plurality of conductors, wherein the groundwall insulation comprises one or more layers of an electrically insulating mica tape, the electrically insulating mica tape comprising:
    (a) an electrically insulating mica paper; and
    (b) a fiber glass disposed on a first surface of the electrically insulating mica paper,
    wherein the electrically insulating mica paper is bound to the fiber glass via a cured form of a curable binder resin composition, wherein the curable binder resin composition comprises:
    21 weight percent to 73 weight percent of a solid or semi-solid epoxy resin having an epoxide functionality of 2.5;
    0.8 weight percent to 49 weight percent of a liquid epoxy resin having an epoxide functionality of 2;
    4 weight percent to 15 weight percent of a bisphenol A-formaldehyde novolac;
    a metal acetylacetonate catalyst; and
    2.5 weight percent to 15 weight percent of a toughener selected from the group consisting of polyethersulfone, methylmethacrylate butadiene styrene, and a combination thereof.

11. The stator bar of claim 10, wherein concentration of the toughener ranges from 5 weight percent to 10 weight percent of the curable binder resin composition.

12. The stator bar of claim 11, wherein the toughener is polyethersulfone.

13. The stator bar of claim 10, wherein the toughener is methylmethacrylate butadiene styrene, and wherein concentration of the methylmethacrylate butadiene styrene ranges from 11 weight percent to 15 weight percent of the curable binder resin composition.

14. The stator bar of claim 10, wherein the solid or semi-solid epoxy resin is an epoxy novolac resin, and wherein concentration of the epoxy novolac resin ranges from 53 weight percent to 61 weight percent of the curable binder resin composition.

15. The stator bar of claim 14, wherein the liquid epoxy resin is a bisphenol A-based epoxy resin, and wherein concentration of the bisphenol A-based epoxy resin ranges from 23 weight percent to 26 weight percent of the curable binder resin composition.

16. The stator bar of claim 10, wherein the groundwall insulation has a flexural strain to failure in a range from 0.4% to 0.9%.

17. The stator bar of claim 10, wherein the stator bar has a heat dissipation factor in a range from 3% to 6% at 155° C.

18. The stator bar of claim 10, wherein the stator bar has an electrical breakdown strength in a range from 500 VPM to 2000 VPM.

19. The stator bar of claim 10, wherein the groundwall insulation comprises 12 to 20 layers of electrically insulating mica tape.

20. A stator bar comprising:
- a plurality of conductors arranged in a group; and
- a groundwall insulation surrounding the group of the plurality of conductors, wherein the groundwall insulation comprises one or more layers of an electrically insulating mica tape, the electrically insulating mica tape comprising:
  - (a) an electrically insulating mica paper; and
  - (b) a fiber glass disposed on a first surface of the electrically insulating mica paper;
  - wherein the electrically insulating mica paper is bound to the fiber glass via a cured form of a curable binder resin composition, wherein the curable binder resin composition comprises:
    - 53 weight percent to 61 weight percent of a solid or semi-solid epoxy resin having an epoxide functionality of 2.5;
    - 23 weight percent to 26 weight percent of a liquid epoxy resin having an epoxide functionality of 2;
    - 4 weight percent to 15 weight percent of a bisphenol A-formaldehyde novolac;
    - a metal acetylacetonate catalyst; and
    - 2.5 weight percent to 15 weight percent of a toughener selected from the group consisting of polyethersulfone, methylmethacrylate butadiene styrene, and a combination thereof.

* * * * *